US012600657B2

(12) United States Patent
    Alexander

(10) Patent No.:  US 12,600,657 B2
(45) Date of Patent:      Apr. 14, 2026

(54) ROTARY BATCH PREHEATER

(71) Applicant: Jeffrey C. Alexander, Newbury, MA (US)

(72) Inventor: Jeffrey C. Alexander, Newbury, MA (US)

( * ) Notice: Subject to any disclaimer, the term of this patent is extended or adjusted under 35 U.S.C. 154(b) by 283 days.

(21) Appl. No.: 17/880,253

(22) Filed: Aug. 3, 2022

(65) Prior Publication Data

US 2023/0040599 A1     Feb. 9, 2023

Related U.S. Application Data

(60) Provisional application No. 63/230,144, filed on Aug. 6, 2021.

(51) Int. Cl.
| | |
|---|---|
| *F28D 11/04* | (2006.01) |
| *C03B 3/02* | (2006.01) |
| *F28D 13/00* | (2006.01) |
| *F28D 21/00* | (2006.01) |

(52) U.S. Cl.
CPC .............. *C03B 3/023* (2013.01); *F28D 11/04* (2013.01); *F28D 13/00* (2013.01); *F28D 2021/0024* (2013.01)

(58) Field of Classification Search
None
See application file for complete search history.

(56) References Cited

U.S. PATENT DOCUMENTS

| | | | |
|---|---|---|---|
| 1,933,571 A | 11/1933 | Trinks | |
| 1,995,948 A * | 3/1935 | Shafter | F27B 7/04 |
| | | | 432/13 |
| 2,715,517 A | 8/1955 | Bojner | |
| 2,848,198 A * | 8/1958 | Bill | B01J 19/28 |
| | | | 366/147 |

(Continued)

FOREIGN PATENT DOCUMENTS

| | | |
|---|---|---|
| CN | 207405066 U | 5/2018 |
| CN | 209428388 U | 9/2019 |

(Continued)

OTHER PUBLICATIONS

Machine Translation PE2E CN 112005072 (Year: 2020).*

(Continued)

*Primary Examiner* — Jodi C Franklin
(74) *Attorney, Agent, or Firm* — Nields, Lemack & Frame, LLC

(57) ABSTRACT

Rotary heat-exchanger for glass batch and/or cullet, comprising a stationary casing having a gas inlet and outlet, and an interior region between the gas inlet and outlet; a chamber positioned in the casing rotatable with respect to the casing and configured to receive batch material or a mixture with cullet; at least one heat exchange tube in the casing in fluid communication with the gas inlet and outlet; a feeder in communication with the chamber and comprising a feeder housing configured to discharge the batch material or mixture of batch material and cullet into the chamber along an infeed length and in contact with the at least one tube;

(Continued)

wherein the infeed length is a length effective to heat the batch or mixture with cullet material up to at least 100° C. in the infeed length. A method of preheating glass batch is also disclosed.

6 Claims, 7 Drawing Sheets

(56) References Cited

U.S. PATENT DOCUMENTS

| | | | |
|---|---|---|---|
| 3,545,988 A | 12/1970 | Slade | |
| 3,753,743 A | 8/1973 | Kakuda et al. | |
| 3,845,941 A * | 11/1974 | Mendenhall | E01C 19/1036 366/24 |
| 3,975,002 A * | 8/1976 | Mendenhall | F28D 11/04 366/7 |
| 4,184,861 A | 1/1980 | Erickson et al. | |
| 4,225,332 A | 9/1980 | Tsay | |
| 4,248,616 A | 2/1981 | Seng et al. | |
| 4,303,434 A | 12/1981 | Rough, Sr. et al. | |
| 4,350,512 A | 9/1982 | Krumwiede | |
| 4,353,726 A | 10/1982 | Rough, Sr. | |
| 4,410,347 A | 10/1983 | Krumwiede | |
| 4,684,342 A | 8/1987 | Harcuba | |
| 4,696,690 A | 9/1987 | Roloff | |
| 4,797,092 A | 1/1989 | Pieper | |
| 4,881,947 A * | 11/1989 | Parker | C10K 3/04 202/136 |
| 4,913,069 A | 4/1990 | Schultz et al. | |
| 4,977,839 A * | 12/1990 | Fochtman | B09B 3/45 48/209 |
| 5,052,810 A * | 10/1991 | Brock | E01C 19/1036 366/64 |
| 5,123,942 A | 6/1992 | Argent et al. | |
| 5,125,943 A | 6/1992 | Cole | |
| 5,290,334 A | 3/1994 | Alexander | |
| 5,342,427 A | 8/1994 | Alexander | |
| 5,344,229 A * | 9/1994 | Nath | F26B 25/005 432/103 |
| 5,399,181 A | 3/1995 | Sorg | |
| 5,529,762 A | 6/1996 | Alexander | |
| 5,538,340 A * | 7/1996 | Brashears | E01C 19/1036 366/147 |
| 5,556,443 A | 9/1996 | Alexander | |
| 5,578,102 A | 11/1996 | Alexander | |
| 5,603,910 A | 2/1997 | Alexander | |
| 5,716,205 A * | 2/1998 | Tratz | C10B 47/30 432/103 |
| 5,741,342 A | 4/1998 | Alexander | |
| 5,759,507 A | 6/1998 | Delling et al. | |
| 5,773,529 A | 6/1998 | Alexander | |
| 5,779,748 A | 7/1998 | Alexander | |
| 5,855,636 A | 1/1999 | Alexander | |
| 5,954,851 A | 9/1999 | Sakae | |
| 6,129,873 A * | 10/2000 | Shelby | B29B 7/429 264/102 |
| 6,196,710 B1 * | 3/2001 | Swanson | E01C 19/1031 34/131 |
| 6,615,612 B2 | 9/2003 | Alexander | |
| 7,669,792 B1 * | 3/2010 | Anderson | F26B 11/0445 241/299 |
| 8,099,981 B2 | 1/2012 | Barklage et al. | |
| 9,664,445 B2 * | 5/2017 | Trattner | F26B 11/0409 |
| RE46,896 E | 6/2018 | Charbonneau | |
| 2007/0227191 A1 | 10/2007 | Kobayashi et al. | |
| 2010/0279242 A1 | 11/2010 | Barklage et al. | |
| 2012/0085845 A1 * | 4/2012 | Landis | E01C 19/05 241/23 |
| 2013/0026275 A1 * | 1/2013 | Landis | E01C 19/05 241/284 |
| 2013/0199240 A1 | 8/2013 | Lindig et al. | |
| 2015/0007445 A1 * | 1/2015 | Gebhard | F26B 11/026 34/108 |
| 2016/0023936 A1 | 1/2016 | Lindig et al. | |
| 2017/0121206 A1 | 5/2017 | Kobayashi | |
| 2018/0029915 A1 | 2/2018 | Huber | |
| 2018/0305213 A1 * | 10/2018 | Lin | B01J 19/22 |
| 2023/0038523 A1 | 2/2023 | Alexander | |
| 2023/0278904 A1 | 9/2023 | Alexander | |
| 2024/0383792 A1 | 11/2024 | Alexander | |

FOREIGN PATENT DOCUMENTS

| | | | |
|---|---|---|---|
| CN | 112005072 A * | 11/2020 | C04B 11/007 |
| CN | 113173689 A | 7/2021 | |
| CN | 114655691 A * | 6/2022 | B65G 69/181 |
| DE | 19707891 A1 | 9/1998 | |
| JP | 56-120522 A | 9/1981 | |
| JP | 2001248966 A * | 9/2001 | |
| NO | 20211503 A1 * | 12/2010 | F27B 7/34 |
| PL | 2655271 T3 * | 7/2018 | F27D 7/02 |
| WO | 2021/148599 A1 | 7/2021 | |

OTHER PUBLICATIONS

PE2E translation NO_20211503 (Year: 2010).*
Office action mailed May 8, 2023 in co-pending U.S. Appl. No. 17/880,256.
European communication dated Aug. 7, 2023 in co-pending European patent application No. 23158942.5.
Office Action mailed Feb. 8, 2024 in co-pending U.S. Appl. No. 17/880,256.
US Department of Energy, Energy Efficiency and Renewable Energy, Industrial Technologies Program, "Electrostatic Batch Preheater System: New System Uses Furnace Exhaust to Preheat Batch and Cullet and Abate Emissions in Glass Melting", Mar. 2007, 2 pages.
The American Ceramic Society, A Collection of Papers Presented at the 61st Conference on Glass Problems: Ceramic Engineering and Science Proceedings, vol. 22, Issue 1, copyright 2001, published online Mar. 26, 2008, edited by Charles H. Drummond, Chapter 4 "Electrostatic Batch Preheating Technology: E-Batch", pp. 37-53, by Jeffrey C. Alexander.
Leone Industries: Experience with Cullet Filter/Preheater, Glass Problems Conference Presentation, Oct. 30, 2006, pp. 1-8, by Larry Barrickman & Peter Leone.
Office action mailed Mar. 20, 2015 in co-pending U.S. Appl. No. 14/025,055.
Final Rejection mailed Oct. 28, 2015 in co-pending U.S. Appl. No. 14/025,055.
Office action mailed May 1, 2015 in co-pending U.S. Appl. No. 14/025,070.
Office action mailed Aug. 10, 2015 in co-pending U.S. Appl. No. 14/025,070.
European communication dated Apr. 4, 2023 in corresponding European patent application No. 22188676.5.
Final Rejection mailed Oct. 26, 2023 in co-pending U.S. Appl. No. 17/880,256.
European communication dated Dec. 20, 2022 in corresponding European patent application No. 22188675.7.
European communication dated Dec. 20, 2022 in co-pending European patent application No. 22188676.5.
Office action mailed Jul. 27, 2023 in co-pending U.S. Appl. No. 17/880,256.
Notice of Allowance mailed May 2, 2024 in co-pending U.S. Appl. No. 17/880,256.
European communication dated Nov. 29, 2024 in corresponding European patent application No. 22188675.7.
Notice of Allowance mailed May 7, 2025 in co-pending U.S. Appl. No. 18/113,740.
European communication dated Jun. 3, 2025 in co-pending European patent application No. 23158942.5.
European communication dated Sep. 23, 2025 in co-pending European patent application No. 22188676.5.

(56)         References Cited

OTHER PUBLICATIONS

Office Action mailed Feb. 26, 2026 in co-pending U.S. Appl. No. 18/785,126.

* cited by examiner

SECTION A-A

SECTION B-B

END VIEW
MAGNIFIED

BOTTOM VIEW

SECTION C-C

ROTARY BATCH PREHEATER

This application claims priority of U.S. provisional application Ser. No. 63/230,144 filed on Aug. 6, 2021, the disclosure of which is hereby incorporated by reference.

BACKGROUND

1. Field

Embodiments disclosed herein relate to a method and apparatus for preheating raw materials for glass manufacture using waste heat from the glass melting process.

Glass is made by heating and melting a mixture of solid raw materials to a liquid state. The melting is done inside of a furnace and necessarily requires substantial amounts of heat. Typically, this heat is generated by the combustion of fossil fuels and the exhaust gases from the combustion leave the furnace. Exhaust gas temperatures immediately after the furnace are quite high, typically 1300-1450° C. In some cases, combustion air preheaters are included which recover some of the heat in these gases. Even so, gas temperatures at the discharge to atmosphere are quite high, thus substantial amounts of heat are wasted. The cost of fuel for heating the furnace is a major component in the cost of making glass.

The raw materials for glass are typically referred to as batch and cullet. The word batch generally refers to an assemblage of various pulverous materials including silica sand, limestone, soda ash, salt cake, and a variety of other minor ingredients. The material and mixture ratios are carefully chosen to produce glass of the desired properties and quality. Generally, these materials are prepared in a finely divided form to promote their melting rates. Sizes are typically 100 to 200 μm diameter with a maximum size of 1 mm. These materials are blended in a device called the batch mixer. From the mixer, the material is transported by a system of conveyors to the glass melting furnace.

The word cullet generally refers to recycled glass, either from the factory or from external sources. For ease of handling cullet is generally crushed to sizes less than 50 mm before use in the glass furnace. Typically, batch and cullet are blended before introduction to the melting furnace.

The embodiments disclosed herein can be advantageously used to preheat the batch or batch and cullet mix using heat from the exhaust gases. By preheating these materials before they are introduced to the furnace, the amount of fuel required for heating and melting them in the furnace can be reduced. This fuel reduction can represent a substantial economic benefit to the glass making process and reduces the emission of harmful gases (such as NOx and $CO_2$) simply because less fuel is burned.

Fossil fuel fired glass furnaces are of several different designs. When air is combusted with fuel, the air is typically preheated in regenerative or recuperative heat exchangers, utilising some of the waste heat exiting the furnace. As well, nominally pure oxygen can also be used for combustion, in which case no waste heat recovery equipment is typically involved.

While the embodiments disclosed herein could be advantageously applied to any of the glass production schemes, its benefits are greatest in the case of oxygen-fuel fired furnaces. This is because exhaust gas temperatures are higher, thus batch can be preheated to high temperatures, and because reduction in fuel requirements for the furnace is accompanied by a proportional reduction in the oxygen supply (and thus cost) for the furnace.

The embodiments disclosed herein represent a significantly better method and apparatus compared to prior art.

2. Description of Prior Art

Many different technologies for batch and cullet preheating have been proposed in the past. Reference is made to "Method and Device for Preheating Raw Materials for Glass Production, Particularly A Cullet Mixture", U.S. Pat. No. 4,696,690. In this device, furnace exhaust gases are passed through "flow ducts" inside of a bunker. The upper half of the flow ducts are formed by equal sided angle sections arranged to form a roof like structure inside the bunker. The angles provide an open bottom and the cullet mixture (batch and cullet mixed) itself forms the bottom half of the flow duct, due to its angle of repose under the roof.

The cullet mixture is introduced to the bunker through its open top. The cullet mixture is moved downward by gravity, thus providing continuously renewed surfaces in the flow ducts that are exposed to the furnace exhaust gases. Heat is transferred to the cullet mixture primarily because of the direct contact with the hot gases.

The flow ducts are arranged in horizontal rows, with the furnace gas divided to flow through the ducts of a given row in parallel. Multiple rows of flow ducts are provided one above another with internal tunnels to direct the flow successively from the lower banks to the upper banks. The result is to achieve a countercurrent flow of hot gases with the downward moving cullet mixture in the bunker. The cullet mixture is fed out of the device through a nozzle as controlled by a conventional device such as a vibratory, screw, or other mechanical type feeder.

Such devices have been successfully operated but have found only limited applicability in the glass industry. Preheating of the cullet mixture and reduced fuel consumption of the furnace has been well demonstrated. As well, partial removal of $SO_2$, HCl, and HF has been realised. However, several operational limitations to the device have been observed:

1. Excessive amounts of dust from the batch material are entrained in the furnace gases flowing through the flow ducts and carried out of the unit with the exhaust gases.
2. Formation of agglomerates of the cullet mixture inside the device. These agglomerates block the proper flow of material and render the device inoperable.
3. To minimize the negative effects of agglomerate formation, the flow ducts are widely spaced. As a result, the equipment is large, heavy, and expensive to install.
4. To break up the agglomerates, the device is constrained to operate with cullet mixtures that have a high cullet to batch ratio.

A second relevant prior art is "Electrostatic Batch Preheater and Method of Using the Same", U.S. Pat. No. 6,615,612. In this device, furnace gases are also passed through flow tunnels with open bottoms in a batch hopper. These flow tunnels are arranged to extend through the hopper side walls and plenums are provided so that the gases can be made to flow through several rows of flow tunnels in parallel. A high voltage discharge electrode is located axially in each tunnel. The corona discharge from the electrode acts to retain batch dust and prevent its entrainment into the flowing gases. Particulate matter is simultaneously precipitated onto the batch surface. While these improvements remedy the dust entrainment problem of U.S. Pat. No. 4,696,690, the flow ducts are still widely spaced, resulting in large, expensive equipment. The additional high voltage equipment adds further to the cost.

Slade teaches "Glass Manufacturing Method", U.S. Pat. No. 3,545,988. In this device, the sand and light soda ash for use in batch is pre-treated to form free flowing agglomerates that are substantially dust free. The agglomerates are formed because the light soda ash (sodium carbonate anhydrous) is converted to sodium carbonate monohydrate as a tightly adhering coating on the sand grains. The treated sand and soda ash is then mixed with the rest of raw materials before delivery to the glass melting furnace. The result is a batch that can be easily handled without dusting either inside or outside the furnace with substantially improved furnace performance. However, the process described to achieve said agglomerates is complex and expensive, so has found limited use in the industry.

Bojner teaches "Rotary, Tubular Heat Exchanger", U.S. Pat. No. 2,715,517, the disclosure of which is hereby incorporated by reference, which is like the instant device but has not been used for heating glass batch. In the device, wet granular material is fed into the interior of a rotating drum at one end. The drum is configured with a plurality of tubes supported at the end plates of the drum. Holes in the end plates and plenums allow hot gases to flow through the inside of the tubes. Heat is transferred from the hot gases to the material through the tube walls. As the wet material progresses along the length of the drum, the material is dried and then heated. Hot material is discharged from the outlet end of the drum. A problem with this prior art as applied to wet glass batch material is that the wet batch will form cakes on the outside of the tubes as the water from the wet batch is evaporated. Such cakes will reduce the heat transfer rate of the device and eventually render it unusable.

The subject of this disclosure is an improvement on this machine to enable it to operate with wet glass batch material.

SUMMARY

In view of the foregoing, the following are certain objects or benefits of the described embodiments:

1) A device to transform wet glass batch into dry, free flowing, dust free glass batch prior to its introduction to the glass melting furnace.
2) A device to treat wet glass batch prior to its introduction to the glass melting furnace to improve its the melting characteristics.
3) A device to transfer heat from glass furnace exhaust gases to glass batch prior to its introduction to the glass melting furnace.

In some embodiments, the device is a rotary, indirect, tubular heat exchanger and may include or be configured to include one or more of the following features:

1) Wet glass batch including soda ash is delivered to the inside of a rotating drum chamber;
2) Said drum is fitted with tubes extending between end plates of the drum. The end plates include holes adjacent to each tube end;
3) Hot furnace exhaust gases are passed through the tubes;
4) Heat is transferred from the hot gases, through the tube walls and into the glass batch;
5) Said wet glass batch infeed is spread out over a length of the drum, termed the infeed length and defining an "infeed zone" of the drum;
6) The infeed length is designed so the heat provided from the tubes in the infeed zone is more than the heat required to heat the incoming batch above 100° C. and evaporate the water contained in the wet batch;

7) With said design, all the material residing in the drum will be dry and there will be no possibility to form cakes of batch on the outside of the tubes;
8) Water evaporated from the wet batch fills the interior of the drum and is vented out or allowed to escape from the drum interior;
9) Said venting is controlled so that the relative humidity inside the drum is greater than 72%. In some embodiments this can be accomplished by reducing or eliminating leakage, such as leakage that occurs around seals of rotating components, into the drum to reduce or eliminate air infiltration;
10) The dry batch inside the drum is in contact with the water vapor inside the drum;
11) Said water vapor reacts with said dry soda ash portion of the batch in the infeed length to form sodium carbonate monohydrate;
12) Glass batch is further heated progressively as it travels downstream of the infeed zone;
13) Said sodium carbonate monohydrate is subsequently dehydrated in the downstream zone, yielding anhydrous sodium carbonate coated on silica sand grains;
14) Treated hot glass batch exiting the device is fed into the glass melting furnace.

Accordingly, in some embodiments, disclosed is a rotary heat-exchanger, comprising: a stationary casing having a gas inlet, a gas outlet spaced from said inlet, and an interior region between said gas inlet and said gas outlet; a chamber positioned in said stationary casing, said chamber being rotatable with respect to said stationary casing and configured to receive batch material or a mixture of batch and cullet material; at least one heat exchange tube in said chamber in fluid communication with said gas inlet and said gas outlet, said at least one heat exchange tube having a first end and a second end spaced from said first end; a first tube plate attached to said first end of said at least one tube and a second tube plate attached to said second end of said at least one tube, and an outlet attached to said second tube plate and in communication with said chamber for discharging said batch material or mixture of batch and cullet material; a feeder in communication with said chamber, said feeder comprising a feeder housing configured to discharge said batch material or mixture of batch material and cullet into said chamber along an infeed length and in contact with said at least one tube; wherein said infeed length is a length effective to heat said batch or mixture of batch and cullet material up to at least 100° C. in said infeed length.

In some embodiments, the rotary heat-exchanger may further comprise an annular gap between the chamber and the stationary casing that is in fluid communication with the gas inlet and the gas outlet.

In some embodiments, the feeder comprises a screw auger.

In some embodiments, the feeder housing has a slot through which the batch material or mixture of batch material and cullet is discharged and distributed over the infeed length.

In some embodiments, the chamber has a total length between the first and second tube plates, and wherein the infeed length is at least ¼ of that total length.

In some embodiments, the rotary heat-exchanger comprises an annular gap between the stationary casing and chamber, and wherein the annular gap is in fluid communication with the gas inlet.

In some embodiments, the feeder comprises a driving force for dispersing the batch material or mixture of batch material and cullet into the chamber along the infeed length. In some embodiments, the driving force comprises a source of compressed air.

In some embodiments, disclosed is a method of preheating a batch or a mixture of batch and cullet, said batch or mixture comprising soda-lime glass comprising soda ash, said method comprising:

introducing exhaust gas from a glass melting furnace into a rotary heat exchanger comprising at least one heat exchange tube, a stationary casing having a gas inlet in fluid communication with a source of said exhaust gas, a gas outlet spaced from said gas inlet, and an interior region between said gas inlet and said gas outlet, and a chamber in said interior region having a batch infeed length;

causing said exhaust gas to flow through said at least one heat exchange tube;

introducing said batch or mixture into said chamber along said infeed length of said chamber and rotating said chamber with respect to said stationary casing to allow said batch or mixture to contact said at least one heat exchange tube to transfer heat from said exhaust gas flowing through said at least one heat exchange tube to said batch or mixture to preheat said batch or mixture, wherein said infeed length is effective to allow said batch or mixture to reach a temperature of at least 100° C. in said infeed length; and discharging the preheated batch or mixture from said chamber.

In some embodiments, the infeed length is effective to form sodium carbonate monohydrate from the soda ash.

In some embodiments, the method the batch or mixture is introduced into the chamber through a slot in a feeder housing that distributes the batch or mixture over the batch infeed length.

In some embodiments, the batch or mixture is introduced into the chamber with a driving force. In some embodiments, the driving force comprises a source of compressed air.

In some embodiments, the method further comprises introducing the preheated batch or mixture to a glass melting furnace.

In some embodiments, the exhaust gas is introduced into a plurality of heat exchange tubes of the rotary heat exchanger, and wherein the rotation of the chamber allows the batch or mixture to contact the plurality of heat exchange tubes to transfer heat from the exhaust gas flowing through the plurality of heat exchange tubes to the batch or mixture to preheat the batch or mixture.

In certain embodiments, disclosed is a rotary heat exchanger for indirectly transferring heat from glass furnace exhaust gases to wet glass batch material, or to a mixture of wet glass batch material with cullet, containing soda ash, comprising in combination:

a. A stationary casing including a circumferential side wall and spaced annular end walls each having a central opening, b. An inlet for said furnace exhaust gases at one end of the stationary casing, c. An outlet for said furnace exhaust gases at the opposite end of the stationary casing, d. A rotary structure within the stationary casing including a cylindrical substantially horizontally disposed shell having spaced ends, e. Respective tube plates at each end of the shell and a plurality of tubes secured to the tube plates and extending longitudinally within the shell, f. Centrally disposed collar means attached to each annular tube plate extending beyond the adjacent end wall of the casing and providing communication with the interior of the shell, g. Said rotary structure being spaced from the stationary casing at the side wall and at each end wall thereof, h. Said tube plates including holes such that said longitudinally extending tubes communicate with the spaces beyond the tube plates, i. The rotary structure defining in combination with the stationary casing an annular chamber around the shell and annular end chambers around the collar means in communication with said inlet and outlet for passing said furnace exhaust gases through the tubes and around the shell, j. Said collar means extending through the central openings of the end walls of the stationary casing and having a gas-sealed rotary fit therein, k. One collar means constituting a passageway for batch material feeding means, l. Means for continuously feeding wet batch material into the interior of said rotary structure to form a bed of material within said shell and end plates and around the longitudinally extending tubes thereof, said batch material in said bed being mixed because of rotation of said structure, m. Said feeding means configured so that the wet batch material infeed is dropped onto said bed and is spread over a sufficient infeed length of the rotary structure that the heat transferred from the hot gases over the infeed length is sufficient to heat batch material up to 100° C. and evaporate the water in the batch.

n. Said feeding means configured so that the bed of material remains dry along the entire length of the rotary structure, o. The opposite collar means constituting an outlet for passing the dried and heated batch material from the bed, p. Means journaling said rotary structure exteriorly of the stationary casing at the collar means, q. And drive means applied to at least one collar means for rotating said structure.

In some embodiments, at least some of the soda ash is converted to sodium carbonate monohydrate within the rotary structure.

In some embodiments, the feeding means distributes the wet batch, or batch and cullet mixture, over a length at least ¼ of the total length of the rotary structure shell.

In some embodiments, the feeding means comprises a screw feeder with housing extending inside the rotary structure shell, said housing including a slot cut into its bottom, the batch, or batch and cullet mixture, being pressed through the slot by the screw auger so that batch is distributed over the necessary infeed length.

In some embodiments, the feeding means comprises a screw feeder extending to the inlet end of the rotary structure shell and a compressed air lance configured to project the batch falling from the screw feeder over the necessary length of the rotary structure shell.

Also disclosed is a rotary heat exchanger for indirectly transferring heat from glass furnace exhaust gases to wet glass batch material, or wet glass batch and cullet mixture, containing soda ash comprising in combination:

a. A stationary casing including a circumferential side wall and spaced annular end walls each having a central opening, b) An inlet for said furnace exhaust gases at one end of the stationary casing, c) An outlet for said furnace exhaust gases at the opposite end of the stationary casing, d) A rotary structure within the stationary casing including a cylindrical substantially horizontally disposed shell, e) Tube plates at the ends of the shell and a plurality of tubes secured to the tube plates and extending longitudinally within the shell, f) Centrally disposed collar means attached to each annular tube plate extending beyond the adjacent end wall of the casing and providing communication with the interior of the shell, g) Said rotary structure being spaced from the stationary casing at the side wall and at each end wall thereof, h) Said tube plates including holes such that said longitudinally extending tubes communicate with the spaces beyond the tube plates, i) The rotary structure defining in combination with the stationary casing an annular chamber around the shell and annular end chambers around the collar means in communication with said inlet and outlet for passing said furnace exhaust gases through the tubes and around the shell, j) Said collar means extending through the central openings of the end walls of the stationary casing and having a gas-sealed rotary fit therein, k) One collar means constituting a passageway for batch material feeding means, l) Means for continuously feeding wet batch material into the interior of said rotary structure to form a bed of material within said shell and end plates and around the longitudinally extending tubes thereof, said batch material in said bed being mixed because of rotation of said structure, m) A portion of said sodium carbonate in the batch being converted to sodium carbonate monohydrate in said rotary structure.

BRIEF DESCRIPTION OF THE DRAWINGS

The above and other aspects of the embodiments disclosed herein will now be described in further detail, by way of example only, with reference to the accompanying drawings, in which.

DETAILED DESCRIPTION

Figure 1:
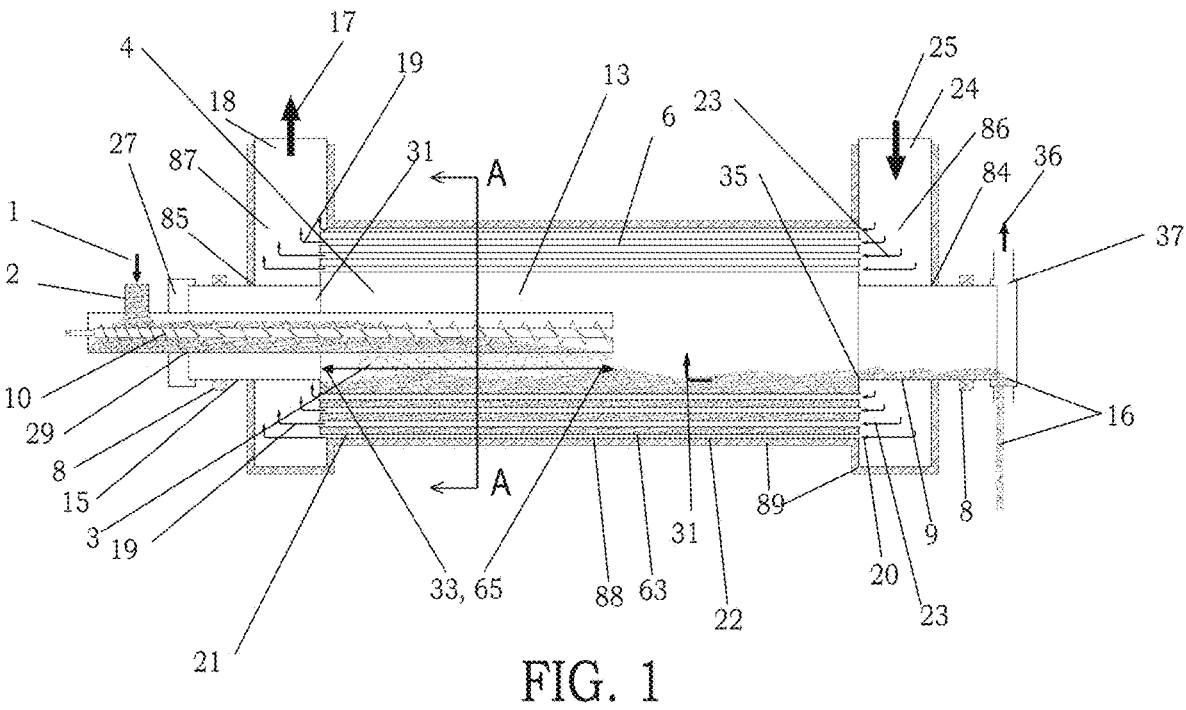
FIG. 1 is a cross-sectional view of the interior of a preferred embodiment of a rotary batch preheater.

Embodiments disclosed herein concern themselves with the manufacture of soda-lime glass, the most common glass type manufactured. At a glass factory, a variety of raw materials are mixed and then melted in the furnace. The principal ingredients in the manufacture of soda-lime glass are silica sand ($SiO_2$), limestone (calcium carbonate, $CaCO_3$), and soda ash (sodium carbonate, $Na_2CO_3$). In addition, a variety of minor ingredients can be added to promote special properties, including sodium sulfate ($Na_2SO_4$), carbon (C), gypsum ($CaSO_4$), aluminum oxide ($Al_2O_3$), selenium (Se), cerium, cobalt oxide, and others.

Most glass manufacturing operations assure that batch includes about 3-4% water when introduced to the furnace. If not naturally occurring as a contaminant in the raw materials, glass manufacturing operations often will add water to the batch. This is desirable to reduce dusting during material handling and to prevent segregation of the various batch constituents during handling and charging of the furnace.

As previously mentioned, a major problem with use of batch preheaters in the glass industry is formation of large agglomerates of batch inside the preheater. It has been discovered that these agglomerates are formed because of the heating of the combination of liquid water with soda ash in the preheater.

Soda ash will typically comprise 15% to 18% of the total batch mass, with ranges as wide as 12% to 20%. Soda ash is water soluble, hygroscopic, and will form a variety of hydrated forms when contacted with water. When soda ash is mixed with the water some of the soda ash dissolves into the liquid water. If batch with dissolved soda ash is subsequently heated and dried, the dissolved soda ash will leave a solid residue that will act as a cement to agglomerate the various mixture constituents together. This is the cause of agglomeration problems in the prior art batch preheaters.

When sodium carbonate anhydrous (SCA) is contacted with water, various hydrates can be formed, specifically sodium carbonate monohydrate (SCM), $Na_2CO_3 \cdot H_2O$, sodium carbonate heptahydrate (SCH), $Na_2CO_3 \cdot 7H_2O$, and sodium carbonate decahydrate (SCD), $Na_2CO_3 \cdot 10H_2O$. When initially contacted with water at room temperature, SCA will dissolve into the water to its saturation concentration of about 32 g/100 ml. This dissolution is exothermic and heats batch material, normally to temperature above 40° C.

When subsequently heated, as in a batch and cullet preheater, the water will be evaporated and leave behind the SCA solute as a residue. This residue will act as a binder to adhere the grains of the batch material together and form an agglomerate. These agglomerates will clog the preheater device, preventing flow of the batch material and rendering the device inoperable. Formation of such agglomerates is a natural result of the transition of wet batch to dry batch upon heating.

The other main batch ingredients, silica sand and limestone, are not water soluble. As a result, when they are mixed with water and then heated, the water will evaporate but will not contribute to the residue of dissolved material.

Embodiments disclosed herein take advantage of several features regarding soda ash/water physicochemical properties, including some or all of the following:

1) Soda ash readily dissolves into water. Saturation concentration is between 31 and 34.5 g/100 ml depending upon temperature. The dissolution process is exothermic.

2) When the solution of soda ash and water is cooled to temperature below 32° C., Sodium Carbonate Decahydrate will be formed as a solid substance.

3) When water with dissolved soda ash is evaporated, the solute residue consists of sodium carbonate monohydrate if the temperature is greater than 35.4° C.

4) Sodium carbonate is hygroscopic. When anhydrous sodium carbonate is exposed to air temperature above 34.5° C. and with relative humidity greater than 72%, water vapor will be reacted with the sodium carbonate to form sodium carbonate monohydrate. This process is exothermic.

5) Sodium carbonate monohydrate (SCM) is a stable solid between temperatures of 34.5° C. and 109° C.

6) SCM thermally decomposes to sodium carbonate and water vapor at temperature above 109° C. The water does not go through a liquid phase. This process is endothermic.

7) SCM contains 85.48% $Na_2CO_3$ and 14.52% $H_2O$ by weight.

Figure 7:
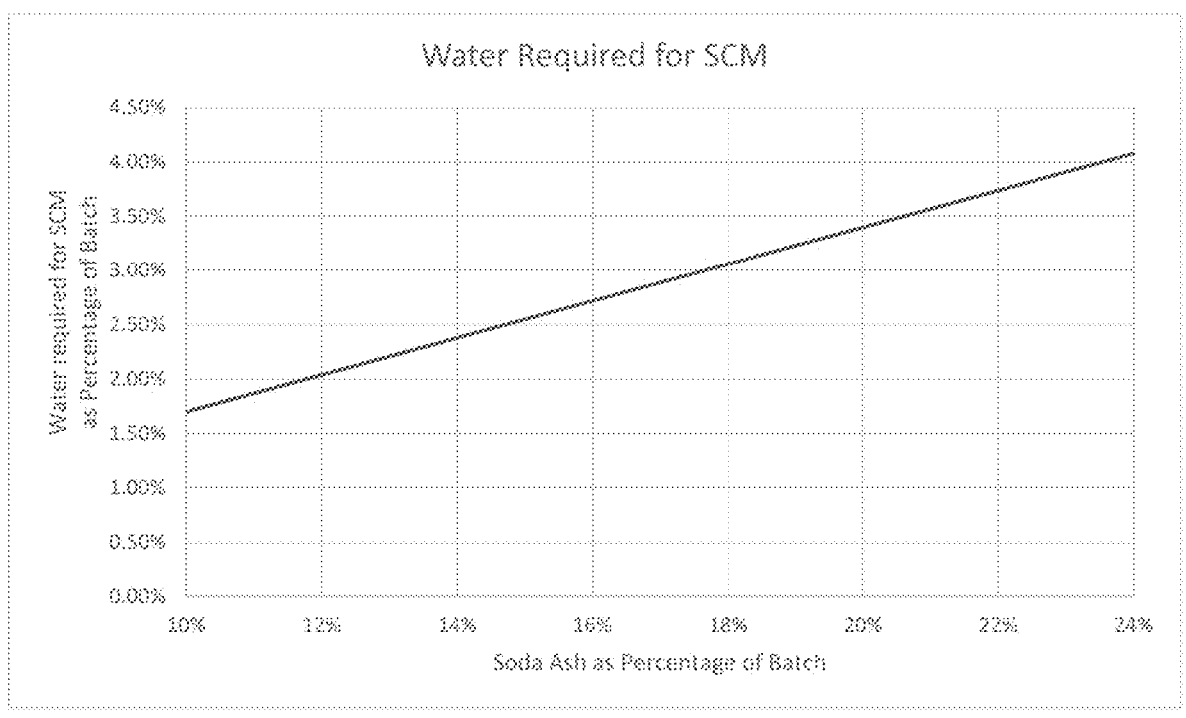
FIG. 7 is a graph that shows the stoichiometric amount of water required (as a percentage of the total batch weight) for the formation of SCM from soda ash.

FIG. 7 shows the stoichiometric amount of water required (as a percentage of the total batch weight) for the formation of SCM from soda ash. Batches typically contain from 15% to 18% soda ash and from 3% to 4% water. Taking batch with 18% soda ash as an example, stoichiometric conversion of all the soda ash to SCM would consume batch water of 3.1%. Thus, if this batch were made with 4% water, residual water after SCM conversion would be 0.9%.

As discovered by Slade (U.S. Pat. No. 3,545,988) dry batch which has been treated by exposure to atmospheres with high humidity will transform SCA into SCM as a coating on the silica sand grains. The resulting treated batch exhibits substantially less dust generation during handling processes and in the furnace than untreated batch.

Another discovery made by the present inventor is that batch which has been treated as described above exhibits more rapid melting in the glass furnace than untreated batch. It is postulated that the SCM coating on the silica sand grains improves the rate of fluxing action for melting of the silica. Soda ash melts at lower temperature than silica, and molten soda ash will serve as flux to melt the silica at lower temperature than pure silica will melt.

Figure 2:
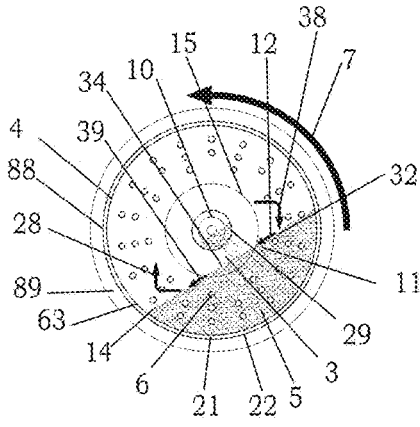
FIG. 2 is an orthogonal cross-sectional view taken along line A-A of FIG. 1 of the interior of a preferred embodiment of the rotary batch preheater.

A preferred embodiment is now described with reference to FIG. 1 and FIG. 2. While the description here specifies treatment of batch, it is to be understood that the material being treated could also be a mixture of batch and cullet. Wet batch depicted by arrow 1 is delivered to the inlet 2 of a feed screw housing 29. A screw auger 10 is positioned in the housing 29 and is equipped with a motor drive, not shown, and is rotated to feed batch into a chamber, such as a rotating structure or drum 4. Suitable rotational speeds of the screw auger 10 can be determined by those skilled in the art to achieve the desired infeed rate; the rotational speed of the infeed screw auger 10 will determine the batch throughput of the device. Batch free falls as illustrated at 3 from the feed screw housing 29 onto a surface of existing batch 34 inside rotating structure 4.

Figure 3A:
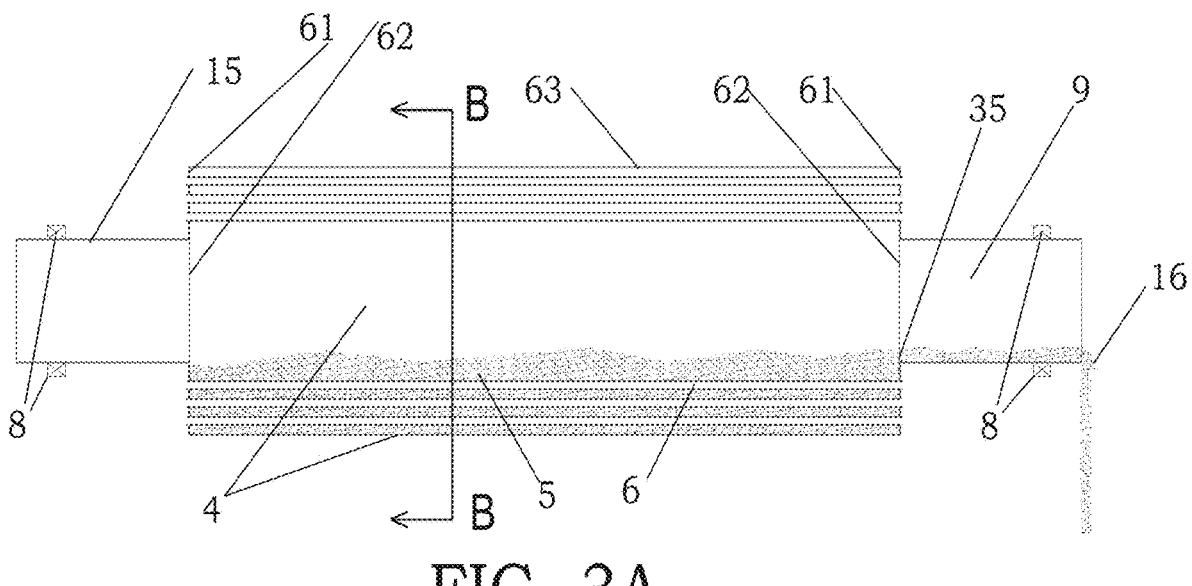
FIG. 3A is a cross-sectional view of a rotating drum chamber in accordance with certain embodiments.
Figure 3B:
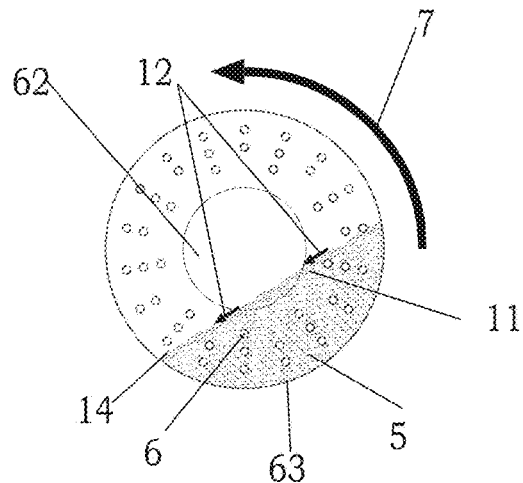
FIG. 3B is a view of the rotating drum chamber taken along line B-B of FIG. 3A.

An embodiment of a rotating structure, drum, or chamber 4 alone is depicted in FIG. 3A. In the embodiment shown, the rotating structure or drum 4 rotates relative to stationary casing 88 and comprises a cylindrical shell 63 with tube plates 61 at either end. Suitable dimensions of the rotating structure 4 include a diameter of 1200 mm to 2400 mm, and a length of 2000 mm to 5000 mm. A plurality of tubes 6 are configured to be connected to the tube plates 61 and span the length of the cylindrical shell 63. Although any number of tubes 6 may be used, in some embodiments there may be between 50 to 200 tubes, with inside diameters of 30 mm to 70 mm and outside diameters of 38 to 78 mm, made of a thermally conductive material such as stainless steel or alumina ceramic, for example. Each tube plate 61 includes a plurality of holes respectively aligned with each tube and attached to each tube 6, such as with an external clamp on the tube to keep the tube from sliding out of the hole. The clamp acts as a flange at each end outside the tube plate, and a ceramic fiber gasket may be inserted between the flange and the tube plate to seal the tubes from the batch and gas, but allow them to thermally expand. Preferably each hole is round and has an inside diameter slightly larger than the outside diameter of the tube 6. Each tube plate 61 also may include a centrally located hole 62 with attached centrally disposed collars, the inlet cylinder 15 and outlet cylinder 9. Inlet cylinder 15 and outlet cylinder 9 extend beyond the stationary casing end walls and pass through the openings 84, 85. During start-up, the rotating structure 4 is partially filled with batch material 5 so that some of the tubes 6 are covered, e.g., about ¼ to about ⅓$^{rd}$ of the tube may be covered. The structure 4 is rotatable in the direction of arrow 7 by a motor and drive, not shown. The rotating assembly is supported by an inlet cylinder 15 and outlet cylinder 9, which may be journaled at 8, to be supported such as on rollers (not shown). The journaling 8 is configured to be radially outside of the stationary casing openings 84 and 85 as seen in FIG. 1. In operation, the structure 4 becomes filled with batch 5. As the structure or drum 4 is rotated, batch contained in the drum 4 is rotated as well until the top surface 11 (FIG. 3B) of the bulk batch reaches the material's angle of repose (the angle at which the material on the slope face is on the verge of sliding). If the batch is dry, the individual grains of batch will slide over the surface 11 down to the lower end of the batch surface 14 (FIG. 2, shown at 12). In this way, the batch material is constantly being contacted with the tubes 6 and the individual grains of batch material are mixed well several times each rotation of the rotating drum chamber 4.

Returning to FIG. 1, hot furnace exhaust gases 25 enter the stationary casing 88, which may be comprised of a circumferential side wall 22, gas inlet 24, gas inlet annular chamber 86, gas outlet annular chamber or plenum 87 spaced from gas inlet annular chamber or plenum 86, and gas outlet 18. Stationary casing 88 includes spaced annular end walls having central openings 84 and 85. Gases then flow from gas inlet plenum 86 in the direction of arrows 23 through all the tubes 6. They also flow in the direction of arrow 20 through the gap 21 between the rotating structure shell 63 and circumferential side wall 22. Gases exit (in the direction of arrows 19) the tubes 6 and gap 21 into the outlet plenum 87, to outlet 18 and are discharged as shown by arrow 17 from the device. The hot gases heat the thermally conductive surfaces of the tubes 6 and rotating structure shell 63. These hot surfaces are in contact with the batch 5 inside the chamber and heat the batch. Heat is transferred from hot furnace gases 25 to batch 5. Both the batch and the water in the batch are heated as they travel through the rotating structure 4. The outside surfaces of the stationary casing 88 may be covered with insulation 89 to mitigate or prevent heat losses in the overall system.

Figure 4A:
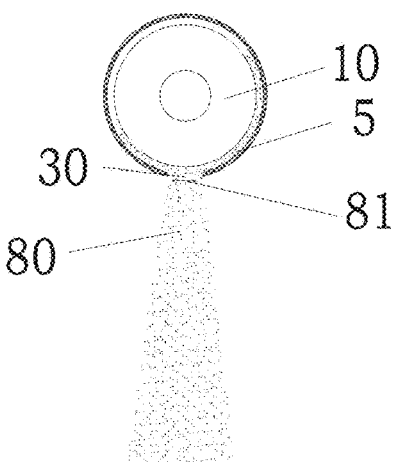
FIG. 4A is an end view of a batch infeed screw assembly in accordance with certain embodiments.
Figure 4B:
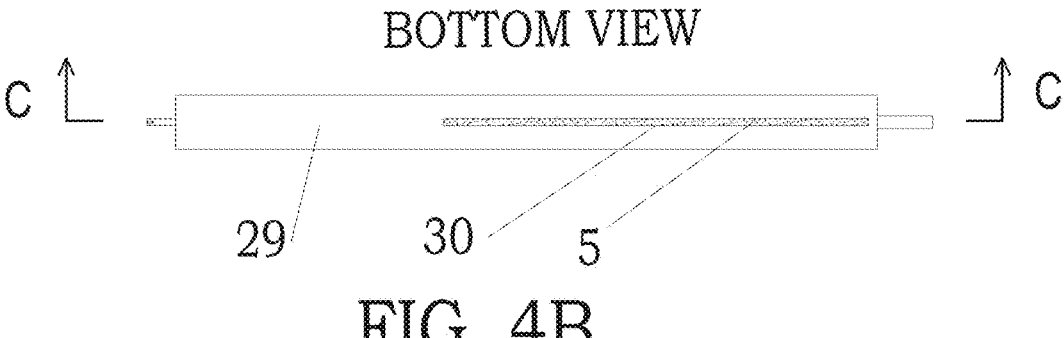
FIG. 4B is a bottom view of the infeed screw assembly of FIG. 4A.
Figure 4C:
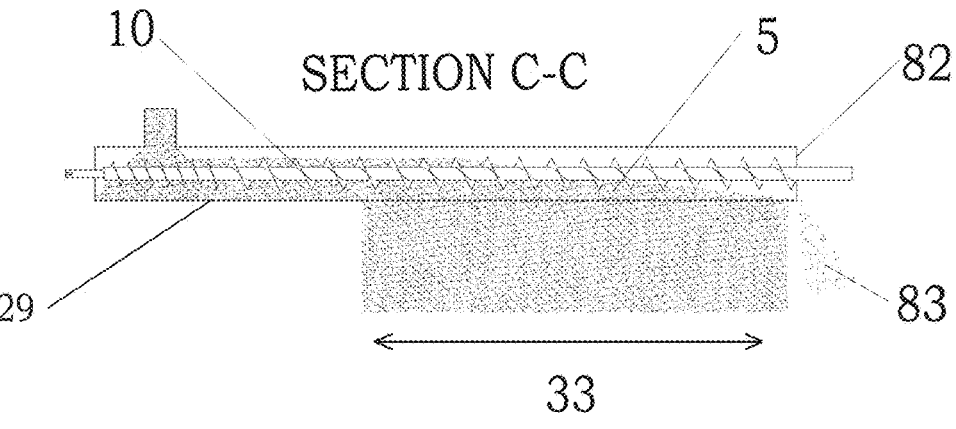
FIG. 4C is a cross-sectional view taken along line C-C of FIG. 4B.

FIGS. 4A, 4B and 4C show a preferred mechanism for spreading the batch 5 evenly along the desired infeed length 33 in the rotating structure 4. A slot 30 in the bottom of the feed screw housing 29 is provided that allows batch 5 to pass (shown at 80 in FIG. 4A) through the housing 29 for the desired length 33. In some embodiments, the length of the slot 30 may be about ¼ to ½ of the length of the entire rotating structure 4. The batch 5 does not free flow through the slot 30 due to its moisture content; specifically, the moisture makes the batch 5 bridge over the slot 30. As auger 10 rotates in the housing 29, it continuously presses batch through the slot 30. The width 81 of the slot 30 is set so as to achieve uniform distribution of the batch, usually determined by test operation and adjustment. Typically slot 30 will be of width between ¼" and 1" wide. In some instances, the width of the slot 30 need not be uniform; it can be tapered so that it is narrower at one end compared to the other, for example.

The end 82 of screw housing 29 is typically left open or partially open so that any batch 5 carried by auger 10 that is not pressed through slot 30 is discharged out of the open end of the housing, as shown by element 83.

As additional batch 5 is fed into the rotating structure 4, the level of batch 5 rises until it spills at 35 over into the outlet cylinder 9. It travels along the bottom of cylinder 9 until it drops at 16 off the end of the cylinder 9. In steady state, the amount of batch 5 exiting at 16 the rotating structure 4 will equal the amount 3 of batch 5 fed into the rotating structure 4.

The rotating structure 4 and stationary casing 88 can be operated with a horizontal longitudinal axis. Alternatively, the axis may be inclined to horizontal so that gravity will facilitate the flow of batch through the device. In practice the incline angle can vary from 0° to 10° from horizontal.

In operation, as wet batch at initial temperature 20° C. (e.g., ambient temperature) is heated, the heat input first provides for sensible heating of the wet batch, up to temperature 100° C. For batch with 3% water, the sensible heat required is 68 kJ/kg of batch. After the wet batch is heated to 100° C., additional heat input is used for the latent heat of water evaporation. Again, for batch with 3% water, the latent heat required is 68 kJ/kg of batch.

Figures 5A, 5B, 5C:
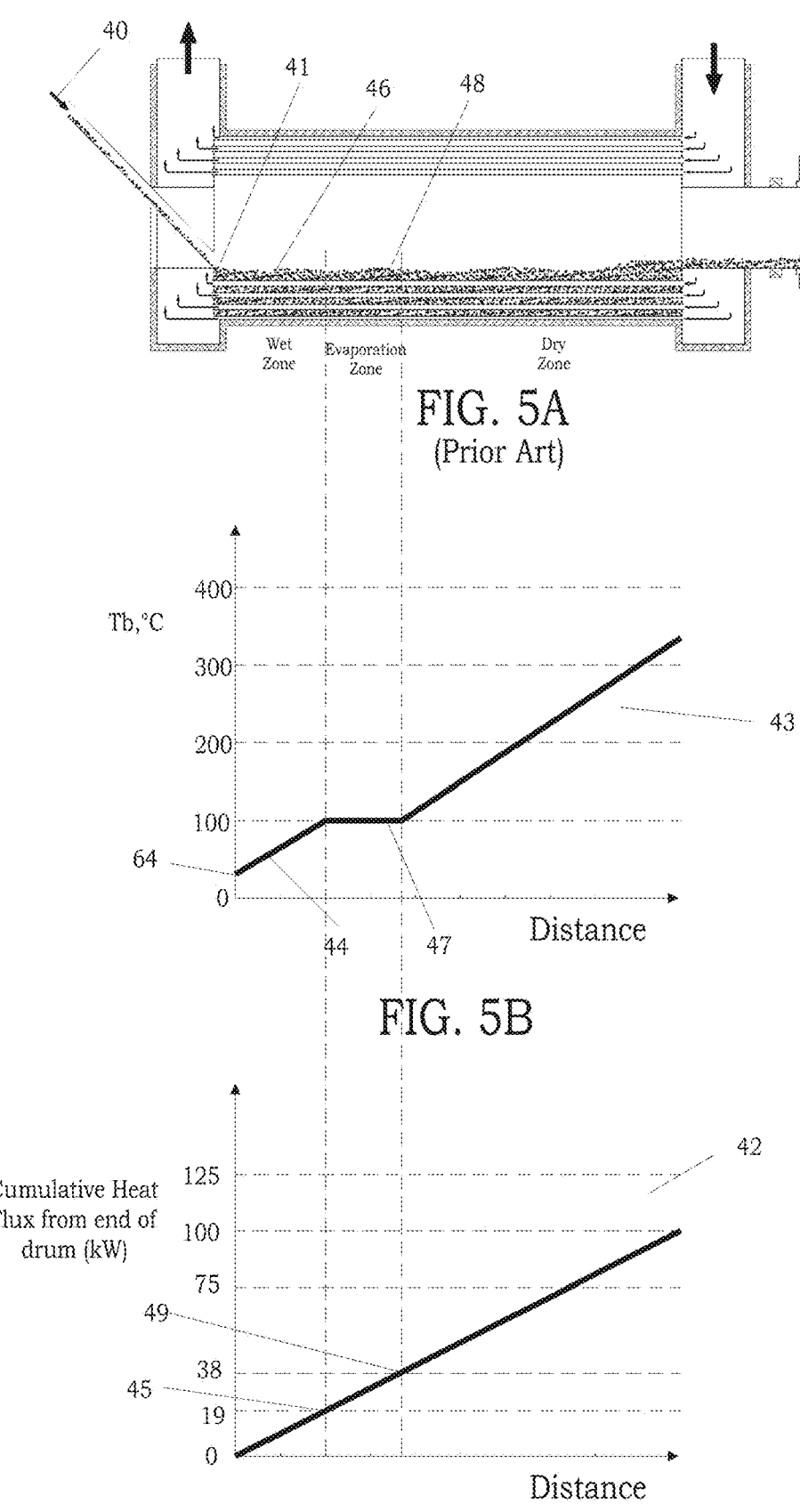
FIG. 5A is a schematic diagram of apparatus in accordance with the prior art.
FIGS. 5B and 5C are graphs of the batch temperature vs. distance and cumulative heat flux from end of drum along the length of the rotating drum for the apparatus of FIG. 5A.

FIGS. 5A, 5B and 5C depict prior art as a comparison to the design of the present invention. Prior art teaches feeding the wet material 40 into one end 41 of a rotating structure. FIG. 5C at 42 shows the cumulative heat flux from the hot gases into the batch as a function of distance from the infeed end. The cumulative heat flux steadily increases from 0 at the infeed point up to 100 kW at the end of the shell. The heat flux depends on the detail design of the machine, i.e., number of gas heat transfer tubes, diameter of shell, inlet gas temperature, etc.

For the example here we specify performance of the machine with batch (with 3% water) infeed rate of 1000 kg/h. The temperature profile of the batch material as it travels through the rotating structure shell is depicted in FIG. 5B, which shows temperature on the vertical axis as a function of distance along the length of the shell. The cold wet batch enters the shell at ambient temperature, taken here at 64 as 20° C. Heat is transferred from the tubes and the wet batch temperature increases in the region depicted by 44 until it reaches 100° C. This sensible heating requires 68 kJ/kg of wet batch, so it corresponds to the point where 19 kW (at 45 in FIG. 5C) of heat has been input from the hot gases. In this section of the shell, termed the wet zone 46 (FIG. 5A), the batch is wet as no water has yet been evaporated. After the wet batch temperature reaches 100° C., any further heat into the material will serve to evaporate water from the batch. Here at 47 in FIG. 5B, the temperature remains at 100° C. while the water evaporates. In this section of the shell, termed the evaporation zone 48 (FIG. 5A), the batch water content will be reduced from its inlet content (3%) to 0%. Complete evaporation of water from batch requires an additional 68 kJ/kg of batch and this point is reached when another 19 kW (for a total of 38 kW (at 49 in FIG. 5C)) of heat has been delivered. In these two zones, the wet zone 46 and the evaporation zone 48, the soda ash will form clumps and cake on the outside of the tubes 6 via the previously described process.

If the batch material is wet the individual grains of batch will adhere to each other and form clumps inside the device. These clumps will not release from the tubes and instead remain attached to the tubes during operation. Then upon further heating and drying, the clumps would form cakes (hard deposits) on the tubes and prevent efficient heat transfer from the hot gases into the batch.

Figures 5D, 5E, 5F:
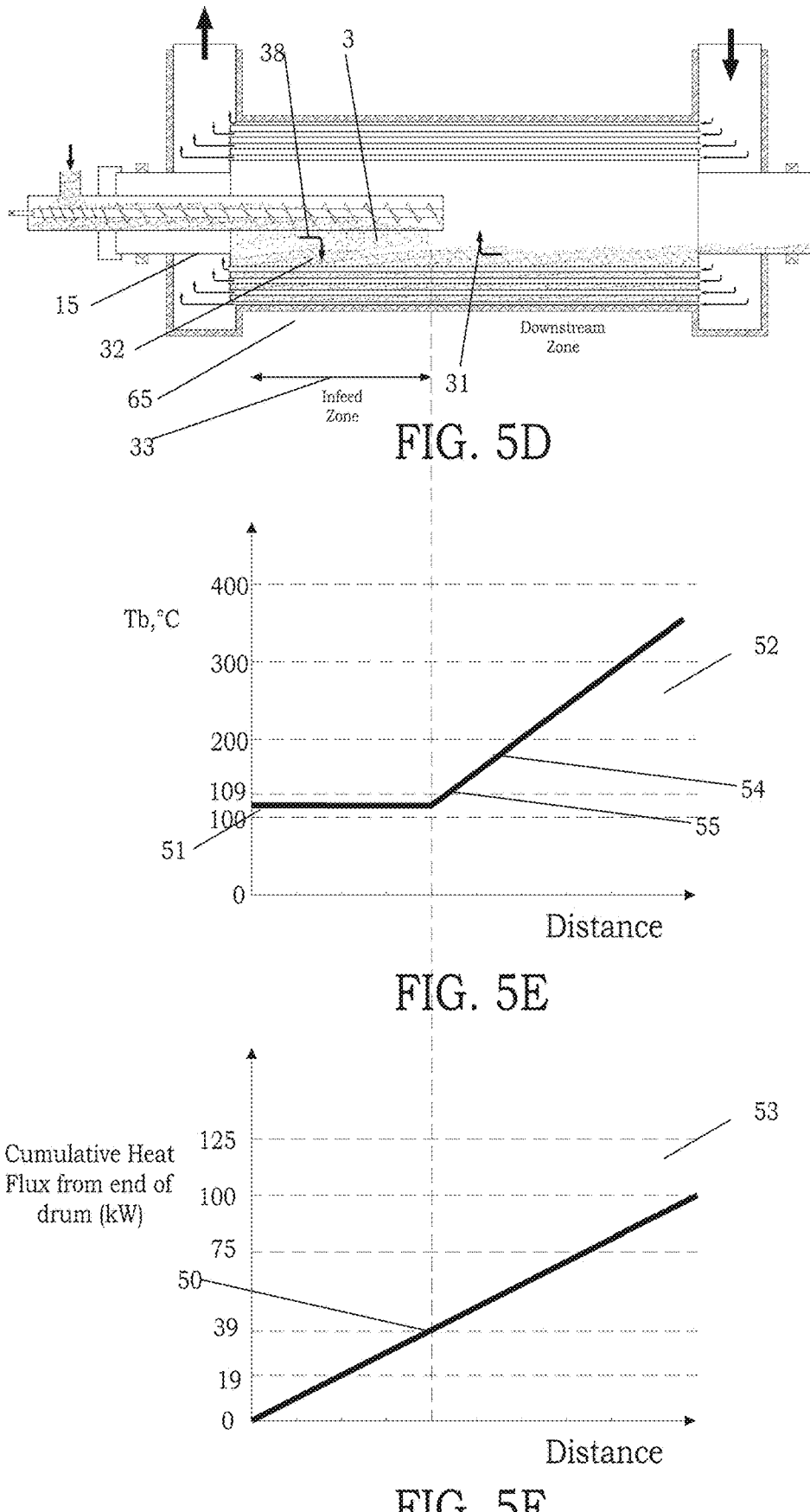
FIG. 5D is a schematic diagram of apparatus in accordance with embodiments disclosed herein.
FIGS. 5E and 5F are graphs of the batch temperature vs. distance and cumulative heat flux from end of drum along the rotating drum for the embodiment of FIG. 5D.

The preferred embodiment per the present disclosure is shown in FIGS. 5D, 5E and 5F. Graphs for batch temperature (FIG. 5E) and Cumulative Heat Flux (FIG. 5F) from the end of shell are shown. The wet batch is introduced in a distributed fashion 3 over the infeed length 33. In certain embodiments, the machine is designed so that the infeed length provides a cumulative heat input rate of 39 kW over the infeed length, as shown by 50 in FIG. 5F. With 1000 kg/h of batch throughput, this heat input is enough to provide sensible heating up to 105° C. (72 kJ/kg) and latent heat of water evaporation of 68 kJ/kg. If the infeed is uniformly distributed, then the temperature shown at 51 in FIG. 5E of the entire infeed zone 65 (infeed length plus infeed width) will be 105° C. Then the entire infeed zone 65 will be dry and as such not susceptible to formation of clumps on the tubes. As the batch travels further along the drum through the downstream zone 66, its temperature is further increased by sensible heating from the hot gas tubes 6, as shown at 54 in FIG. 5E.

To summarize and generalize, if the amount of heat transferred into the batch in the infeed zone 65 exceeds that required to heat batch and water to temperature 51 above 100° C. and to evaporate all the water in the batch, the batch in the infeed zone 65 will be dry and at a temperature above 100° C. Generally, this will result if the infeed length is greater than the length of the wet zone plus the evaporation zone in the corresponding machine with material infeed according to prior art.

Referring again to FIG. 2, for a typical application, the mass flow rate of batch in the sheet flow 12 will be more than 100 times greater than the mass flow rate of wet batch infeed 3. The infeed 3 material quickly mixes with the sheet flow 12 material to form mixed material 39. For example, with infeed 3 moisture content of 3%, the moisture content of the mixed material 39 will be less than 0.03%. Batch with moisture levels less than 1% have been shown to behave like dry material. So, in accordance with embodiments disclosed herein, the mixed material 39 will behave like dry material and not create clumps or cakes on the tubes 6. This small amount of water is then evaporated using heat already in the batch to form water vapor, as depicted by arrow 28. Then, so long as enough heat is transferred into the batch to maintain its temperature greater than 100° C. in the infeed zone, the entire bulk of batch material will remain dry.

The interior atmosphere 13 of the rotating structure shell 4 becomes filled with water vapor evaporated from wet batch as described above. Some air may infiltrate into the shell 4 but the resulting interior atmosphere 13 will in general have high relative humidity (e.g., higher than 72%). If this atmosphere 13 has relative humidity greater than 72% then water vapor 38 will react with the SCA in batch 32 in the infeed zone 65 to form SCM. The reaction is exothermic and provides additional heat to the batch, aiding in the desired function to keep all batch in the infeed zone 65 warm and dry. Depending on the balance between amounts of SC and water in the batch, most if not all the liquid water can be converted to SCM in the device and all the SCA can be converted to SCM. As described earlier, this recrystallization of SCA to SCM has two significant benefits to the glass furnace process:

1. Subsequent handling of the batch will exhibit significantly reduced dust generation.
2. Subsequent melting of the batch will require shorter melting time and reduced melting energy.

As the batch travels further downstream in the device, its temperature increases as shown at 54 in FIG. 5E. When the temperature 55 exceeds 109° C. the SCM will begin to dehydrate, releasing the water molecule to form SCA and water vapor 31. This water vapor will pressurize the interior atmosphere 13 of the drum. Water vapor is vented 36 out of the device through the discharge plenum 37 (FIG. 1).

Figure 6:
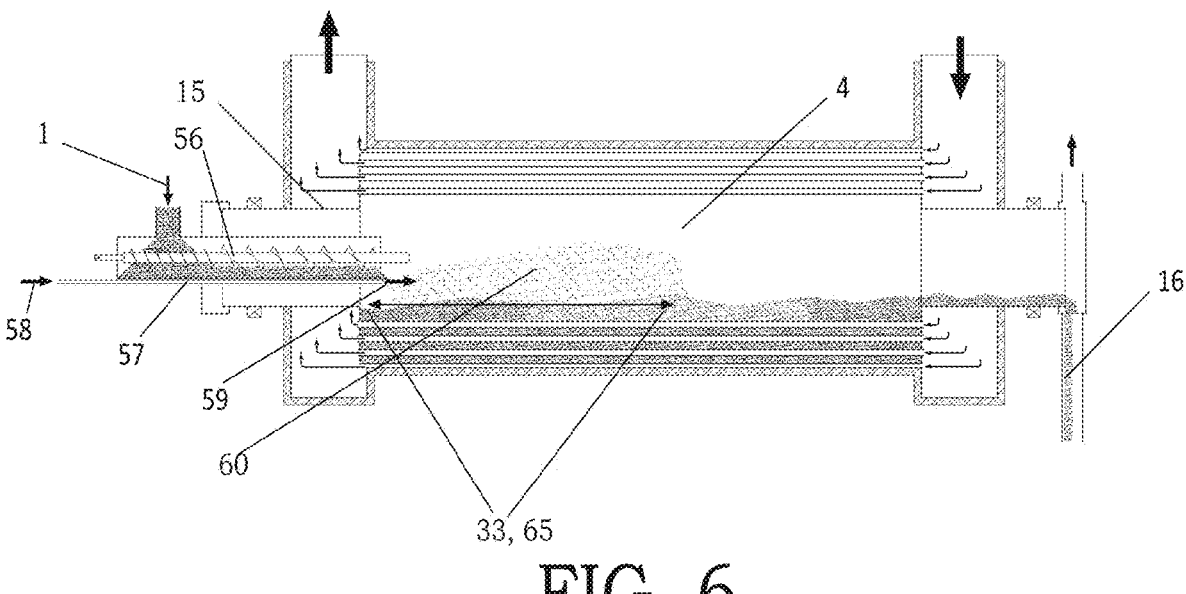
FIG. 6 is a cross-sectional view of the interior of an alternate embodiment of the rotary batch preheater.

An alternate embodiment is depicted in FIG. 6. Infeed screw 56 is now just long enough to extend through the inlet cylinder 15. A pipe lance 57 is provided to direct compressed air 58 to discharge 59 from the lance into the batch as the batch discharges from the infeed screw 56. The compressed air serves to disperse the batch and project 60 it over the infeed length 33 of the drum 4. The length of the dispersion can be controlled by the amount of compressed air 58 delivered to the lance 57. Suitable amounts include amounts between 0.5 and 5 free air cfm. If the wet batch is dispersed uniformly over an infeed length 33 long enough that the amount of heat transferred into the batch in the infeed zone 65 exceeds that required to heat batch and water to temperature 51 above 100° C. and to evaporate all the water in the batch, the batch in the infeed zone 65 will be dry and at temperature above 100° C.

With prior art as depicted in FIG. 5A, a portion of the device is filled with wet material and there will be "wet zones" within the device. In the case of the material being batch, this wet material will have the tendency to form agglomerates or clumps between the tubes. In order to allow this material to release from the tubes, the tubes must be spaced widely apart from each other. For 50 mm diameter tubes, this spacing must be, for example, a minimum of 150 mm apart, otherwise agglomerates will wedge between the tubes and fail to be carried through the device to the outlet. 50 mm diameter tubes spaced 150 mm apart results in 200 mm between centers of the tubes.

Dry batch exhibits a free-flowing characteristic, much like sand in an hourglass. It can flow through structures easily so long as the gap is wider than the piece of batch itself. With the embodiment described herein, there are no "wet zones". As a result, the spacing between the tubes can be much less without the aforementioned problem with agglomerate formation between the tubes. For 50 mm diameter tubes the spacing between tubes can be as low as 50 mm. This results in 100 mm between centers of the tubes.

The amount of heat transferred from the hot gases to the batch and/or cullet is directly proportional to the amount of heat transfer area provided in the device, in this case the surface area of the tubes. With the 50 mm spacing enabled by the embodiment described herein, 4 times the number of tubes can be provided in the rotating structure, compared to the number of tubes that could be provided using prior art. Thus 4 times the heat transfer surface is provided in the same size device as prior art. In practice this manifests itself as higher batch temperature out of the device, a smaller and less expensive device, or a combination of the two.

When cullet is included with batch in the device, the tube spacing must be larger than the largest size piece of cullet. Cullet crushers can sometimes be provided to achieve the optimum size cullet for the device. A typical cullet size specification for a conventional modern crusher is 40 mm maximum size. Such cullet could be handled in the embodiment described herein with 50 mm tube spacing.

Additionally, the design of the embodiment described here with no "wet zones" will have lower maintenance requirements, as most maintenance is associated with cleaning and removing of accumulated agglomerates inside the device. Experience with the embodiment described herein is that the tubes are maintained in a "bare metal" condition.

EXAMPLE

Typical machine operation is described below.

A rotary heat exchanger with rotating chamber of diameter 2100 mm and length of 3650 mm is fitted with 204 tubes. Tubes are 60 mm diameter. The stationary casing is 2150 mm inner diameter so as to provide a gap of 25 mm between the rotating chamber and the stationary casing. Such a device presents 142 square meters of heat transfer area associated with the tubes. The rotary heat exchanger is inclined at an angle of 3° to the horizontal to facilitate batch movement. The chamber rotates at 5 rotations per minute.

9000 kg/h of wet batch (with 3% moisture) at temperature 20° C. is fed into the chamber by a cantilevered screw feeder. The cantilevered screw feeder has a 1500 mm long slot hole cut in its bottom to provide an infeed length of 1500 mm, comprising 41% of the rotating chamber length. Batch infeed is uniformly distributed along the infeed length.

Hot furnace exhaust gases at 550° C. are introduced to the heat exchanger inlet and are cooled to 350° C. at the gas outlet. After steady state is reached, 9000 kg/h of batch exits the heat exchanger at temperature of 370° C. Visual observation confirms that there are no "wet zones" within the heat exchanger and no clumps or agglomerates are formed. The heat transfer rate calculates to be 41 W/m²-° K. based on the tube surface area.

The same size device built with rotating chamber according to prior art would include 52 tubes. Wet batch is fed into the rotating chamber at one end. This design presents 36 square meters of heat transfer area associated with the tubes. Such device would manifest a "wet zone" comprising about 60% of the length of the chamber. In this wet zone, clumps would form and stick inside the chamber and after a short time the machine would have to be shut down. The agglomerates would block the infeed end of the rotating chamber and prevent additional infeed of wet batch. Even if it could avoid clump formation, the device would only heat the cullet/batch mix to 175° C. at the same heat transfer rate of 41 W/m²-° K.

What is claimed is:

1. A rotary heat-exchanger for preheating wet batch material or a wet mixture of batch and cullet material, comprising:

a. a gas inlet annular chamber, a gas outlet annular chamber spaced from said gas inlet annular chamber, and a region between said gas inlet annular chamber and said gas outlet annular chamber;

b. a rotatable chamber positioned in said region and configured to receive batch material or a mixture of batch and cullet material, said rotatable chamber comprising an infeed length and a downstream zone downstream of said infeed length;

c. at least one heat exchange tube in said rotatable chamber in fluid communication with said gas inlet annular chamber and said gas outlet annular chamber, said at least one heat exchange tube having a first end and a second end spaced from said first end;

d. a first tube plate attached to said first end of said at least one tube and a second tube plate attached to said second end of said at least one tube, and an outlet attached to said second tube plate and in communication with said rotatable chamber and downstream of said downstream zone for discharging dry batch material or dry mixture of batch and cullet material;

e. an inlet cylinder extending through said gas outlet annular chamber and attached to said first tube plate, said inlet cylinder being rotatable with said rotatable chamber;

f. a feeder positioned in said inlet cylinder and in communication with said rotatable chamber, said feeder comprising a feeder housing having a bottom and including a slot discharge port in said bottom and an open end discharge port and configured to discharge said wet batch material or wet mixture of batch material and cullet through both said slot discharge port and through said end discharge port into said rotatable chamber along said infeed length and in contact with said at least one tube;

wherein said infeed length is a length effective to heat said wet batch material or mixture of wet batch and cullet material discharged from said feeder housing up to at least 100° C. in said infeed length and evaporate water therefrom.

2. The rotary heat-exchanger of claim 1, wherein said feeder comprises a screw auger.

3. The rotary heat-exchanger of claim 1, wherein said feeder comprises a driving force for dispersing said batch material or mixture of batch material and cullet into said chamber along said infeed length.

4. The rotary-heat exchanger of claim 3, wherein of said driving force comprises a source compressed air.

5. The rotary heat-exchanger of claim 1, wherein said feeder housing is configured to discharge said batch material or mixture of batch material and cullet into said rotatable chamber at a rate R (kg/hr) and along said infeed length and in contact with said at least one tube;

wherein said rotatable heat exchanger is configured to transfer heat to said batch material or mixture of batch and cullet material in said rotatable heat exchanger at a rate $Q_t$ (kW/m) along said chamber length; and wherein said infeed length is at least 0.039 $R/Q_t$.

6. The rotary heat-exchanger of claim 1, wherein said outlet comprises an outlet cylinder extending through said gas inlet annular chamber.

* * * * *